(12) United States Patent
Wetzel

(10) Patent No.: US 9,415,878 B2
(45) Date of Patent: Aug. 16, 2016

(54) COOLING SYSTEM FOR COMPONENTS IN (AIRBORNE) VEHICLE STRUCTURES

(71) Applicant: Siemens Aktiengesellschaft, München (DE)

(72) Inventor: Wolfgang Wetzel, Herzogenaurach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/431,205

(22) PCT Filed: Sep. 10, 2013

(86) PCT No.: PCT/EP2013/068742
§ 371 (c)(1),
(2) Date: Mar. 25, 2015

(87) PCT Pub. No.: WO2014/048731
PCT Pub. Date: Apr. 3, 2014

(65) Prior Publication Data
US 2015/0232191 A1    Aug. 20, 2015

(30) Foreign Application Priority Data
Sep. 26, 2012   (DE) .......................... 10 2012 217 469

(51) Int. Cl.
*B64B 1/24* (2006.01)
*B64D 33/08* (2006.01)
*H01M 10/625* (2014.01)
*H01M 10/6563* (2014.01)

(52) U.S. Cl.
CPC ............. *B64D 33/08* (2013.01); *H01M 10/625* (2015.04); *H01M 10/6563* (2015.04)

(58) Field of Classification Search
None
See application file for complete search history.

(56) References Cited

U.S. PATENT DOCUMENTS

| | | | | |
|---|---|---|---|---|
| 2,117,632 | A * | 5/1938 | Sikorsky | B64D 33/10 123/41.1 |
| 3,005,607 | A | 10/1961 | Ferri | |
| 4,962,903 | A | 10/1990 | Byron | |
| 2004/0195438 | A1 * | 10/2004 | Chamberlain | A63H 27/02 244/65 |
| 2006/0196633 | A1 | 9/2006 | Mahjoub | |
| 2009/0277993 | A1 | 11/2009 | Storch | |
| 2010/0303634 | A1 | 12/2010 | Long | |

FOREIGN PATENT DOCUMENTS

| | | |
|---|---|---|
| CN | 102152849 A | 8/2011 |
| DE | 706 599 C | 5/1941 |
| EP | 1 655 452 A2 | 5/2006 |
| FR | 28 95 324 A1 | 6/2007 |
| GB | 407 530 A | 3/1934 |

* cited by examiner

Primary Examiner — Christopher P Ellis
Assistant Examiner — Richard G Davis
(74) Attorney, Agent, or Firm — Henry M. Feiereisen LLC

(57) ABSTRACT

The invention relates to a device for cooling a component (2) in a vehicle by means of a cooling air flow (4), wherein the device has at least one air inlet (11) and at least one air outlet (12), which are arranged such that the cooling air flow (4) is adjusted from the air inlet (11) to the air outlet (12) as a result of a difference in pressure produced during movement of the vehicle as a result of varying high flow velocities of the ambient air. The invention also relates to a method for cooling a component (2) in a vehicle by means of an above-named device.

4 Claims, 2 Drawing Sheets

COOLING SYSTEM FOR COMPONENTS IN (AIRBORNE) VEHICLE STRUCTURES

CROSS-REFERENCES TO RELATED APPLICATIONS

This application is the U.S. National Stage of International Application No. PCT/EP2013/068742, filed Sep. 10, 2013, which designated the United States and has been published as International Publication No. WO 2014/048731 and which claims the priority of German Patent Application, Serial No. 10 2012 217 469.9, filed Sep. 26, 2012, pursuant to 35 U.S.C. 119(a)-(d).

BACKGROUND OF THE INVENTION

The invention relates to a device for cooling a component in a vehicle by means of a cooling air flow. The invention further relates to a method for cooling a component in a vehicle by means of this device.

Such a device is used for cooling components in vehicles. The cooling is used to discharge heat which is produced by means of losses into the environment. Sources of power loss and consequently heat development are present in a vehicle in many forms. These include in particular mechanical or electrical power losses. Examples of mechanical power loss include in a conventionally driven vehicle the internal combustion engine. Electrical power losses may be produced in the components of the electrical drive train or in an energy store. The cooling can be achieved in that the component which is intended to be cooled is directly passed over by a cooling air flow. Another possibility is first discharging the heat into a fluid which is subsequently discharged into the ambient air by means of a heat exchanger, also referred to as a cooler. In both cases, an air flow which discharges the heat into the environment is required.

In current vehicles, the cooling of components is, on the one hand, carried out by travel wind flowing past. Should this not be sufficient or if no travel wind is present at the relevant location, there are used a large number of fans or ventilators which produce a corresponding air flow. In aircraft which are recently also electrically driven, there are also integrated in load-bearing surfaces batteries which are cooled by means of fans or ventilators inside the load-bearing surface by means of an air circulation.

SUMMARY OF THE INVENTION

An object of the invention is to provide a cooling system which has a cooling air flow which is produced even without fans or ventilators. The cooling system is intended to be able to be used for vehicles, in particular for aircraft. Furthermore, the system is intended to have a high level of reliability and be able to be produced in a cost-effective manner.

This object is achieved by a device for cooling a component in a vehicle with a cooling air flow, wherein the device has at least one air inlet and at least one air outlet which are arranged in such a manner that the cooling air flow is produced from the air inlet to the air outlet as a result of a pressure difference which is produced during the movement of the vehicle as a result of different flow speeds of the surrounding air. The object is further achieved by a method for cooling a component in a vehicle by means of a device according to claim 9.

The invention is based on the recognition that a cooling air flow in a moving vehicle is produced by an air inlet and an air outlet being fitted at suitable locations of the vehicle. Suitable locations for an air inlet are locations with a relatively high pressure. As a result of the Venturi effect, the locations with high pressure are located where the air moves relatively slowly around the vehicle. In contrast, locations with a low pressure are those at which the air moves relatively quickly around the vehicle. The locations with high pressure are referred to as the pressure side, the locations with low pressure are referred to as the intake side. For the arrangement of the air inlets, locations of the pressure side are suitable; for the arrangement of the air outlets, locations of the intake side are suitable. As a result of this arrangement, an air flow is produced from the air inlet to the air outlet. In order to increase the flow action, on the one hand, the size of the air inlets and outlets can be varied or a plurality of air inlets and outlets can also be arranged. Components which require cooling are present in large numbers in a vehicle. In a conventionally driven vehicle, this includes, for example, the internal combustion engine. Even when this discharges its losses in the form of heat to a fluid cooling medium in a primary cooling circuit, it must subsequently be discharged to the environment, which is often carried out by a cooler. The system according to the invention can also be used for this purpose. The device for cooling affords particular advantages when used for cooling components of an electrical drive train. The cooling of electrical or electronic components is in this instance preferably carried out directly by means of passing air. A fluid cooling medium has the disadvantage that, in the event of leakages in the cooling system, the electrical or electronic components may be damaged or destroyed. The level of the losses and the heat development associated therewith is so moderate that it can be produced in an effective manner by means of cooling using the Venturi effect. In contrast to a fluid cooling, in which the guiding of the cooling medium to the various locations has to be carried out through hoses, the guiding of the air by guide plates in the system according to the invention is not absolutely necessary. The cooling air flow which is produced by means of the Venturi effect can additionally be increased where applicable by means of fans or ventilators. In contrast to a conventional forced air cooling system, however, the fans can be sized so as to be significantly smaller. This affords advantages with respect to structural size, costs and in particular in terms of noise development. Since the device for cooling a component also manages without any fans, there are particular advantages with respect to maintenance and production costs here since, when no fans are involved, no costs are incurred for them. Furthermore, a significant advantage is the lower noise development compared with a forced ventilation using ventilators.

Advantageous embodiments of the invention are set out in the dependent claims.

In an advantageous embodiment, the vehicle is an aircraft. In this application, a reliably operating cooling system is absolutely necessary for the operation of the aircraft. This is particularly the case with aircraft having an electric drive configuration (parallel and serial hybrid). The requirements of a cooling system in this instance are therefore in particular reliability and low weight. As a result of the omission of fans, these requirements can be complied with in a simple manner, with at the same time low production costs.

In another advantageous embodiment, the device for cooling is arranged in one or more wings. The term "wing" is self-explanatory in aircraft. However, other vehicles may also have wings. These include devices on the vehicle which, as a result of pressure differences on the device, lead to a resultant force. An example of this is a spoiler on a motor vehicle. In an aircraft, in particular in one with an electrical drive configuration, there is the advantage that the wings can be used to accommodate electrical or electronic components which require cooling. The wing in an aircraft is configured in accordance with structural requirements in such a manner that it represents an intake side at the upper side and a pressure side at the lower side. This structure, which primarily serves to counteract the weight force, is particularly suitable for the use of the cooling system. The lower side of a wing is particularly suitable for fitting an air inlet, whilst the upper side of a wing is particularly suitable for fitting an air outlet. Even with small openings, as a result of the construction-related pressure difference at these two locations, a relatively large cooling air flow is already produced. The advantage of this arrangement consequently involves structurally relatively small air inlets and outlets, which, however, nonetheless bring about a relatively large cooling air flow. Furthermore, the space of the load-bearing surfaces can be used in an efficient manner for the positioning of electronic or electrical components, such as, for example, energy stores in the form of batteries.

In another advantageous embodiment of the invention, the air inlet or the air outlet is constructed as a scoop or as a NACA inlet. The NACA opening is an air inlet or outlet which is favorable in flow terms. It is sized in such a manner that it does not increase the air resistance of the vehicle. For this construction of the air inlet or outlet, it is ensured that the effects on the operation of the vehicle are minimal and enable economic operation.

In another advantageous embodiment, the device has means for influencing the air quantity of the cooling air flow. As a result of these means, it is possible to vary the efficiency of the air cooling. It is thus possible, for example, to adapt the efficiency of the cooling in accordance with the operating state of the vehicle or in accordance with the environmental conditions. This may have a positive effect on the service-life of the electrical and electronic components. The adaptation of the cooling air flow may in this instance be produced in different manners. One possibility is, for example, changing the flow of the air inlets and outlets and consequently the pressure relationships at the air inlet and outlet. A different pressure difference brings about a different flow behavior. Another possibility is constructing the cross-section of the air inlet or outlet in a variable manner. This may be produced, for example, by means of an aperture. This is opened further in the event of an increased cooling requirement than in the case of a low cooling requirement.

In another advantageous embodiment, the components which are intended to be cooled are electrical and/or electronic components. These components are suitable in particular for cooling by means of an air flow. In this type of cooling, the individual components are flushed by the air, which ensures efficient discharge of the heat loss. There is also no risk of damage or destruction as a result of fluid cooling medium. Furthermore, this cooling is also suitable for use in batteries. In addition to the cooling action which is primarily desired, it is ensured at the same time that gases which are produced during operation or in the event of a malfunction, such as, for example, hydrogen, are quickly discharged from the installation space of the batteries. This prevents the production of explosive air/gas admixtures. In particular when the cooling system manages without fans, the danger of ignition of explosive gas admixtures can thereby be significantly reduced. This contributes to a very high inherent safety of the system.

In another advantageous embodiment, the component which is intended to be cooled is an energy store. In particular in aircraft, the arrangement of an energy store in the wings has been found to be advantageous. In aircraft which are moved by means of jet propulsion, the fuel, kerosene, is located in the wings. In conventional aircraft, this fuel also performs the function of the energy store. Consequently, even when the construction is transferred to an electrically driven aircraft, the corresponding construction and positioning of components can also be taken over in a simple manner when the energy stores are accommodated in the wing. At the same time, the wings represent a location which is readily accessible for maintenance purposes and for charging the energy store.

In another advantageous embodiment, the component which is intended to be cooled is a battery. Spaces with batteries often require continuous ventilation in order to prevent the formation of explosive gas/air admixtures. At the same time, the fitting of components which may produce sparks in this space is inappropriate, or even forbidden by regulations. For these reasons, the cooling according to the invention represents an ideal opportunity, on the one hand, for ensuring the cooling of the battery and at the same time for reducing the danger of ignition of any gas/air admixture which may occur to the greatest possible extent since a fan which could act as a source of sparks is not present here.

BRIEF DESCRIPTION OF THE DRAWING

The invention is described and explained in greater detail below with reference to the embodiments shown in the Figures, in which.

DETAILED DESCRIPTION OF PREFERRED EMBODIMENTS

Figure 1:
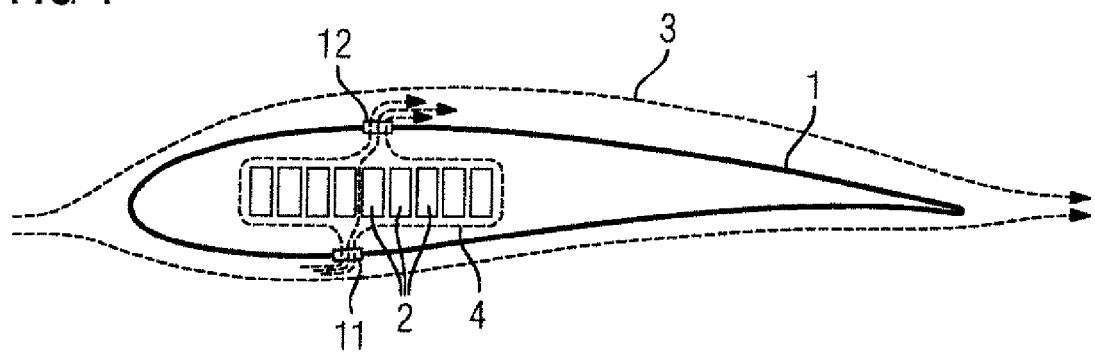
FIG. 1 is a cross-section of a wing in which components which are intended to be cooled are arranged.

FIG. 1 shows the cross-section of a wing 1, in which components 2 which are intended to be cooled are arranged. In this instance, an air inlet 11 is located at the lower side of the wing 1 and an air outlet 12 is located at the upper side of the wing 1. The outer flow 3 which flows past the wing 1 brings about a pressure difference between the air inlet 11 and the air outlet 12 in such a manner that a cooling air flow 4 is formed within the wing 1. The cooling air flow 4 in this instance flows over the components 2 which are intended to be cooled and discharges the heat thereof. In order to increase the cooling action, additional air inlets 11 may be arranged at the lower side of the wing 1 and additional air outlets 12 at the upper side of the wing 1. A regulation of the cooling air flow 4 is also conceivable as a result of different measures. One possible measure is an opening which is variable in terms of cross-section for the air inlet 11 or air outlet 12. As a result of this variable opening, which can be produced, for example, by means of an aperture, the quantity of the cooling air flow 4 and consequently the cooling action can be influenced. It is also possible, by fitting movable guide plates close to the air inlet 11 and/or the air outlet 12, to change the pressure relationships at the relevant locations. This involves a change of the pressure difference between the air inlet 11 and air outlet 12 which acts directly on the cooling air flow 4.

Figure 2:
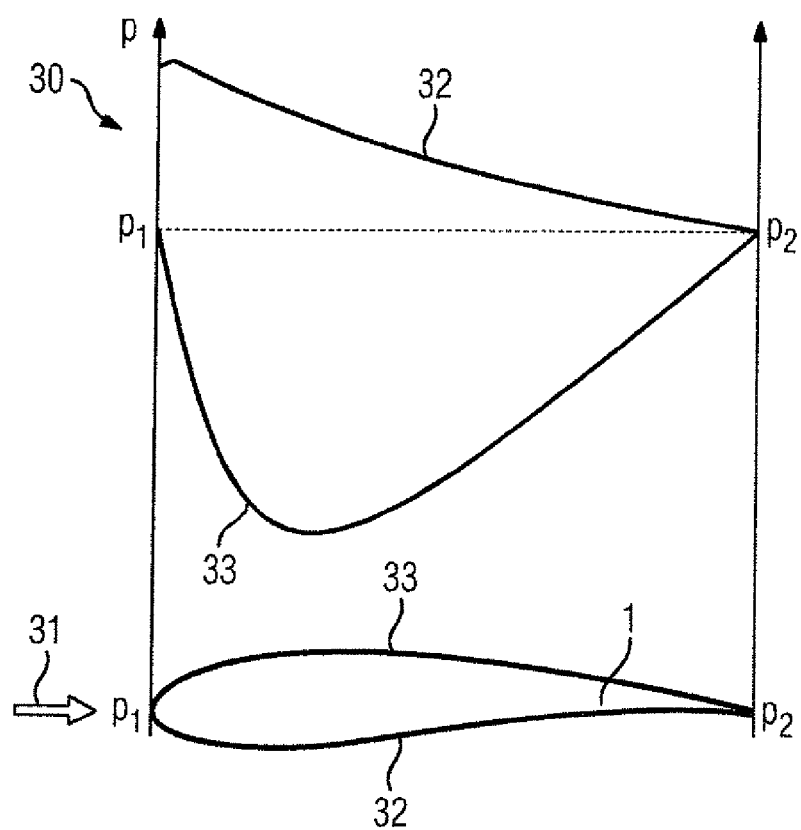
FIG. 2 shows the pressure path at the upper side and at the lower side of the wing.

The pressure relationships at the upper side and lower side of the wing 1 are shown in FIG. 2. In the lower portion of the Figure, a wing 1 is schematically illustrated. The upper side of the wing 1 constitutes the reduced pressure side 33. The lower side of the wing 1 is the excess pressure side 32. The inflow direction 31 of the air in relation to the wing 1 is indicated by an arrow in the lower portion of the illustration. The upper portion of the Figure sets out the pressure path 30 at the excess pressure side 32 and reduced pressure side 33 of the wing 1. The present graph sets out the path in principle. By means of this, it is possible to read off the pressure values for the fitting locations of the air inlet 11 and air outlet 12 with respect to the wing 1. The difference of the pressure values for the air inlet 11 and air outlet 12 constitutes the pressure difference which results in the formation of a cooling air flow 4 in the wing 1.

Figure 3:
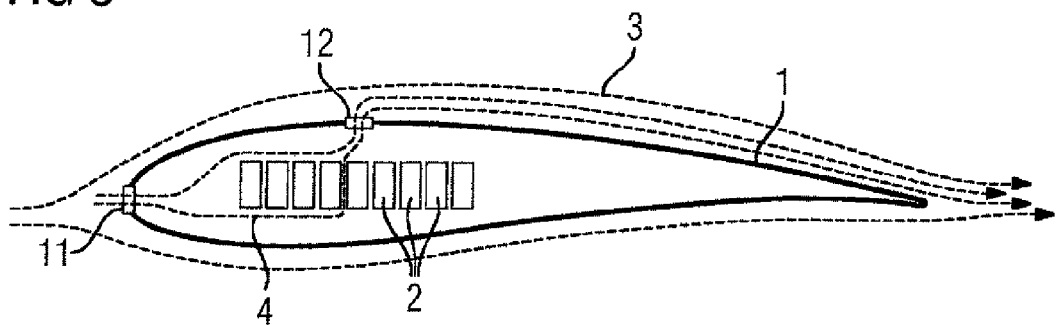
FIG. 3 is a cross-section of a wing with an additional arrangement of the air inlet and outlet.

FIG. 3 is the cross-section of another embodiment of the wing 1. In addition to the lower side of the wing 1, the front side of the wing 1 is also suitable for fitting an air inlet 11. There is also produced here between the air inlet 11 and the air outlet 12 a pressure difference, from which a cooling air flow 4 is formed. The pressure difference can be read similarly from a graph in accordance with FIG. 2. In order to increase the cooling air flow 4, it is possible to position additional air inlets 11 on the lower side of the wing 1 and air outlets 12 on the upper side of the wing 1.

Figure 4:
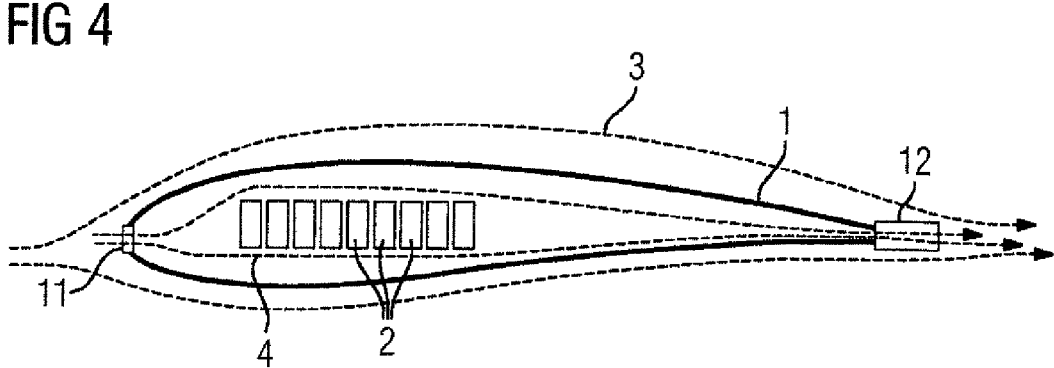
FIG. 4 shows the cross-section of a wing with an alternative arrangement of the air inlet and outlet.

FIG. 4 is a cross-section of another embodiment of a wing 1. This primarily does not use a pressure difference between the air inlet 11 and the air outlet 12 but instead the inertia of the air with respect to the moving vehicle in order to obtain a cooling air flow 4 through the components 2 which are intended to be cooled. This arrangement may also be amplified by using the Venturi effect by one or more air inlets 11 being positioned on the lower side of the wing 1. Alternatively or additionally, additional air outlets 12 may be arranged on the upper side of the wing 1. The cooling power of the cooling system is thereby further increased according to the invention.

Although the invention has been illustrated and described in greater detail by the preferred embodiments, the invention is not limited purely to the disclosed examples and other variants may be derived therefrom by the person skilled in the art without exceeding the protective scope of the invention.

What is claimed is:

1. An aircraft, comprising:
   at least one wing having a battery; and
   a cooling device arranged in the at least one wing and configured to cool the battery by a cooling air flow, said device having an air inlet, arranged on a lower side of the wing at a pressure side, and an air outlet arranged on an opposite upper side of the wing at an intake side such that the cooling air flow is produced from the air inlet to the air outlet as a result of a pressure difference which is produced during movement of the aircraft as a result of different flow speeds of surrounding air.

2. The aircraft of claim 1, wherein at least one of the air inlet and the air outlet is constructed as a scoop and/or as a NACA inlet.

3. The aircraft of claim 1, wherein the device is configured to influence air quantity of the cooling air flow.

4. A method for cooling a battery received in a wing of an aircraft, comprising cooling the battery by an air flow produced as a result of a pressure difference between an air inlet on a lower side of a wing and an air outlet on an opposite upper side of the wing, when an outer flow sweeps past the wing.

* * * * *